(12) United States Patent
Murata et al.

(10) Patent No.: US 8,839,808 B2
(45) Date of Patent: Sep. 23, 2014

(54) ASSEMBLING STRUCTURE OF ACTUATOR PART OF FLUID CONTROL VALVE, AND FLUID CONTROL VALVE FORMED WITH THE STRUCTURE

(75) Inventors: Naofumi Murata, Tajimi (JP); Hiroyuki Murase, Konan (JP); Kazuhiro Sugata, Kasugai (JP); Shinji Ikenoya, Tajimi (JP)

(73) Assignee: CKD Corporation, Komako-Shi (JP)

( * ) Notice: Subject to any disclaimer, the term of this patent is extended or adjusted under 35 U.S.C. 154(b) by 576 days.

(21) Appl. No.: 12/914,175

(22) Filed: Oct. 28, 2010

(65) Prior Publication Data
US 2011/0180154 A1 Jul. 28, 2011

(30) Foreign Application Priority Data
Jan. 26, 2010 (JP) ................................. 2010-014704

(51) Int. Cl.
*F16K 31/00* (2006.01)
*F16K 31/122* (2006.01)
(52) U.S. Cl.
CPC .................................. *F16K 31/1221* (2013.01)
USPC ........ 137/15.19; 251/61.4; 251/331; 137/316
(58) Field of Classification Search
USPC ............... 251/331, 61–63.6; 215/43, 44, 331; 220/293, 296; 222/173, 182, 183; 137/15.19, 316
See application file for complete search history.

(56) References Cited

U.S. PATENT DOCUMENTS

| | | | | |
|---|---|---|---|---|
| 4,128,227 A | * | 12/1978 | Blomqvist | 251/42 |
| 4,180,239 A | * | 12/1979 | Valukis | 251/60 |
| 4,633,898 A | * | 1/1987 | Denk | 137/315.05 |
| 4,646,779 A | * | 3/1987 | Johnson | 137/426 |
| 5,516,075 A | * | 5/1996 | Itoi et al. | 251/58 |
| 5,924,441 A | * | 7/1999 | Leys et al. | 137/312 |
| 5,964,446 A | * | 10/1999 | Walton et al. | 251/127 |
| 6,250,330 B1 | * | 6/2001 | Welker | 137/489 |
| 7,628,376 B2 | * | 12/2009 | Masamura et al. | 251/63.6 |
| 2003/0052293 A1 | | 3/2003 | Enzaki et al. | |
| 2004/0195534 A1 | * | 10/2004 | Ijichi et al. | 251/63.5 |

(Continued)

FOREIGN PATENT DOCUMENTS

| CN | 101460776 A | 6/2009 |
|---|---|---|
| CN | 101614283 A | 12/2009 |

(Continued)

OTHER PUBLICATIONS

Japanese Office Action issued in Japanese Patent Application No. 2010-014704 dated Nov. 15, 2011 (with translation).

(Continued)

*Primary Examiner* — John Rivell
*Assistant Examiner* — Kevin Barss
(74) *Attorney, Agent, or Firm* — Oliff PLC

(57) ABSTRACT

In an assembling structure of an actuator part of a chemical liquid valve, a cover is formed with a protrusion extending in a radial direction of a valve element, and a cylinder is formed with an engagement part engageable with the protrusion. A cover is placed to hold a spring in a compressed state in the cylinder and make a cap part cover an opening of the cylinder. The protrusion and the engagement part are engaged with each other to integrally connect the cylinder and the cover without separating from each other.

6 Claims, 14 Drawing Sheets

(56) References Cited

U.S. PATENT DOCUMENTS

2005/0269533 A1* 12/2005 Fedegari .................. 251/63.5
2007/0284880 A1   12/2007 Zirin
2009/0020722 A1*  1/2009 Masamura ................ 251/331

FOREIGN PATENT DOCUMENTS

| JP | A-2002-054761 | 2/2002 |
| JP | A-2003-090455 | 3/2003 |
| JP | A-2005-140295 | 6/2005 |
| TW | 533289 B | 5/2003 |

OTHER PUBLICATIONS

Jul. 24, 2012 Korean Office Action issued in Korean Application No. 10-2011-0007248 (with partial translation).
Jul. 4, 2012 Search Report issued in Chinese Application No. 201110025154.2 (with translation).
Jul. 4, 2012 Office Action issued in Chinese Application No. 201110025154.2 (with translation).
Jan. 29, 2013 Office Action issued in Korean Patent Application No. 10-2011-0007248 (with translation).
Mar. 29, 2013 Office Action issued in Chinese Patent Application No. 201110025154.2 (English Translation).

* cited by examiner

ASSEMBLING STRUCTURE OF ACTUATOR PART OF FLUID CONTROL VALVE, AND FLUID CONTROL VALVE FORMED WITH THE STRUCTURE

CROSS-REFERENCE TO RELATED APPLICATIONS

This application is based upon and claims the benefit of priority from the prior Japanese Patent Application No. 2010-014704 filed on Jan. 26, 2010, the entire contents of which are incorporated herein by reference.

TECHNICAL FIELD

The present invention relates to an assembling structure of an actuator part of a fluid control valve for controlling the flow of fluid by bringing a valve element into or out of contact with a valve seat, and a cover having the structure. More particularly, the present invention relates to an assembling structure of an actuator part of a fluid control valve including an urging member placed in an opening of a main body to urge a valve element and a cover closing an opening of a cylinder, and a fluid control valve formed with the structure.

BACKGROUND ART

Heretofore, a semiconductor manufacturing device, a liquid crystal panel manufacturing device, and others use such a chemical liquid valve as disclosed in Patent Literature 1, for example. A chemical liquid valve is a fluid control valve arranged to bring a valve element into or out of contact with a valve seat placed between an inlet port and an outlet port to control the flow of chemical liquid or solution from the inlet port to the outlet port. FIGS. 13 and 14 are sectional views of the chemical liquid valve disclosed in Patent Literature 1.

As shown in FIG. 13, a chemical liquid valve 101 includes: an actuator core part having a cylinder 110, a valve element 142, a piston 143, a spring 141 and others; an engagement part 120 closing an opening of the cylinder 110; a body 130 having a valve seat 131, an inlet port 132, an outlet port 133 and others; and a mounting plate 150 for fixing the chemical liquid valve 101.

In the chemical liquid valve 101, the valve element 142 is moved up and down with respect to the valve seat 131 by action of an urging force of the spring 141 such as a coil spring and the pushing force of pressurized operation air AR which will act in an opposite direction to the urging force.

In the actuator core part, the piston 143 connected with the valve element 142 is slidably mounted in the cylinder 110. The spring 141 is placed on a support surface 143a of the piston 143 on an opposite side from a pressure-receiving surface of the piston 143 which will be subjected to the operation air AR. The spring 141 is placed with its both ends being supported on the support surface 143a of the piston 143 and a support surface 126a of the cover 120 that closes the opening of the cylinder 110, so that the spring 141 urges the valve element 142 toward the valve seat 131 by its spring force.

The cover 120, the actuator core part, the body 130, and the mounting plate 150 are stacked and assembled integrally for manufacture of the chemical liquid valve 101. Specifically, as shown in FIG. 14, first bolts 160 inserted through the cover 120 are tightened against the mounting plate 150 through the cylinder 110 and the body 130 to fix them.

The chemical liquid valve is assembled not only for manufacture. For example, the chemical liquid valve disassembled for maintenance after use is assembled again. In a disassembling work, the pushing force of operation air is not applied to the valve element 142, so that the valve element 142 is in contact with the valve seat 131 by the spring force. In this state, when the first bolts 160 tightened against the mounting plate 150 are loosened one by one, the actuator core part is apt to incline with respect to the body 130, pressing the valve seat 131, causing plastic deformation of the valve seat 131.

To protect the valve seat 131 and others during disassembling, Patent Literature 1 shows the structure that a pin 115 is inserted in an indicator 145 during disassembling, as shown in FIGS. 13 and 14, the valve element 142 is forcibly held apart from the valve seat 131 to improve workability in the disassembling work.

CITATION LIST

Patent Literature

Patent Literature 1: JP 2005-140295A

SUMMARY OF INVENTION

Technical Problem

However, at the time of assembling for manufacture or reassembling after disassembling of the conventional chemical liquid valve 101, the cylinder 110 of the actuator core part with the spring 141 being placed on the piston 143 is fixed to the cover 120 with second bolts (not shown) in advance before the cover 120, the actuator core part, and the body 130 are fixed to the mounting plate 150 with the first bolts 160. This causes a problem with an increased number of components and hence cost increase.

This problem results from the following reasons. Specifically, in an assembling process of the chemical liquid valve 101, the piston 143, the valve element 142, the indicator 145, and others are integrally assembled, this assembly is mounted in the cylinder 110, and the actuator core part in which the spring 141 is placed on the support surface 143a of the piston 143 is built up as one unit in advance.

A worker then makes full assembling to stack and assemble the cover 120, the actuator core part, the body 130, and the mounting plate 150 into one unit. In consideration of workability in that full-assembling operation and workability in disassembling operation for maintenance, the actuator core part and the cover 120 are temporarily assembled in advance prior to the full assembling of the entire valve 101.

To be specific, both ends of the spring 141 in the assembled chemical liquid valve 101 are supported on the piston-side support surface 143a and the cover-side support surface 126a to urge the valve element 142 toward the valve seat 131 by its spring force. The length of the spring 141 in a natural or original state is longer than that in a compressed state in the assembled valve 101. When the cover 120 is to be placed to close the opening of the cylinder 110, the spring 141 is forcibly compressed into a shorter length than the original length and set in the chemical liquid valve 101. Some of the chemical liquid valves 101 are arranged to allow a chemical solution to flow at a large flow rate and large pressure through a passage between the inlet port 132 and the outlet port 133. Such chemical liquid valves 101 require a significant large urging force of the spring 141 to bring the valve element 142 into contact with the valve seat 131 for flow control of chemical liquid.

For the chemical liquid valve 101 using the spring 141 particularly having a large spring force, temporary assembling has to be conducted prior to the full assembling of the cover 120, the actuator core part, and others. Otherwise, it is difficult for a worker to tighten the first bolts 160 against the mounting plate 150 while holding the spring 141 in a compressed state by a significant external force. If the temporary assembling is not conducted, the following problem occurs during the work operation. Specifically, when the chemical liquid valve 101 is to be disassembled for maintenance, the first bolts 160 are loosen from the mounting plate 150. At that time, the compressed spring 141 expands back to its natural state. Accordingly, this spring 141 itself and the cover 120 are likely to suddenly jump out.

For avoiding such a trouble, prior to the full assembling of the entire valve 101, the cylinder 110 of the actuator core part built up as one unit and the cover 120 are integrally connected to each other in advance with the second bolts different from the first bolts 160 to perform the temporary assembling of the actuator core part and the cover 120.

This temporary assembling could improve the workability of workers, whereas the use of the second bolts for temporary assembling of the chemical liquid valve 101 leads to an increase in the total number of components of a final product, resulting in a cost increase of the product.

The present invention has been made to solve the above problems and has a purpose to provide an assembling structure of an actuator part of a fluid control valve with reduced cost while maintaining assembling easiness of the fluid control valve including a cover that closes an opening of a cylinder. Another purpose of the invention is to provide a fluid control valve configured with the above actuator-part assembling structure.

Solution to Problem

To achieve the above purpose, one aspect of the invention provides an assembling structure of an actuator part of a fluid control valve arranged to control the flow of fluid by bringing a valve element into or out of contact with a valve seat, the actuator part comprising: a cylinder in which an urging member is placed for urging the valve element, the cylinder including an opening; and a cover for closing the opening of the cylinder, one of the cylinder and the cover being formed with a protrusion extending in a radial direction of the valve element and the other is formed with an engagement part engageable with the protrusion, the cover being placed to hold the urging member in a compressed state in the cylinder and cover the opening of the cylinder, and the protrusion and the engagement part being engaged with each other so that the cylinder and the cover are integrally connected to each other without separation.

Further, according to another aspect, the invention provides a fluid control valve formed with the aforementioned assembling structure of an actuator part of a fluid control valve.

Advantageous Effects of Invention

Operations and effects of the invention having the above configurations are explained below.

For assembling of the fluid control valve, the aforementioned assembling structure of the actuator part of the fluid control valve requires no bolts which are conventionally needed for integrally temporarily assembling the actuator core part including the piston, the urging member, the cylinder, and others, which are combined in one unit, with the cover in advance before the full assembling of the entire valve.

To be concrete, the fluid control valve mainly includes the cover, the actuator core part, the body having the valve seat, the inlet port, the outlet port, and others, and the mounting plate for fixing the fluid control valve. When this fluid control valve is to be assembled for manufacture or is to be reassembled after disassembled for maintenance after use, workers perform full assembling of the entire valve by integrally stacking or combining the cover, the actuator core part, the body, and the mounting plate, and then fixing them with bolts.

At the time of assembling the fluid control valve, the urging member is compressed from its natural state to a shorter length and then installed in the valve. This work is troublesome for workers. At the time of disassembling the fluid control valve for maintenance after use, the compressed urging member is apt to expand back at a burst to its natural state by detachment of the cover. It is thus necessary to consider the workability of workers during disassembling of the chemical liquid valve for maintenance. Accordingly, prior to the full assembling of the entire valve, the actuator core part and the cover have to be temporarily assembled in advance. Heretofore, bolts are used only for the temporary assembling.

Consequently, in the aforementioned assembling structure of the actuator part of the fluid control valve, there is no need to use bolts for temporary assembling. This results in the reduced number of components of the entire fluid control valve, leading to const reduction of the fluid control valve.

DESCRIPTION OF EMBODIMENTS

A detailed description of a preferred embodiment of an assembling structure of an actuator part of a fluid control valve, and a fluid control valve formed with the structure, according to the present invention will now be given referring to the accompanying drawings.

In the present embodiment, the fluid control valve is a chemical liquid valve to be used in e.g. a semiconductor manufacturing device, a liquid crystal panel manufacturing device, and others. This fluid control valve is arranged to bring a valve element into or out of contact with a valve seat located between an inlet port and an outlet port to control the flow of chemical liquid from the inlet port to the outlet port.

Figure 1:
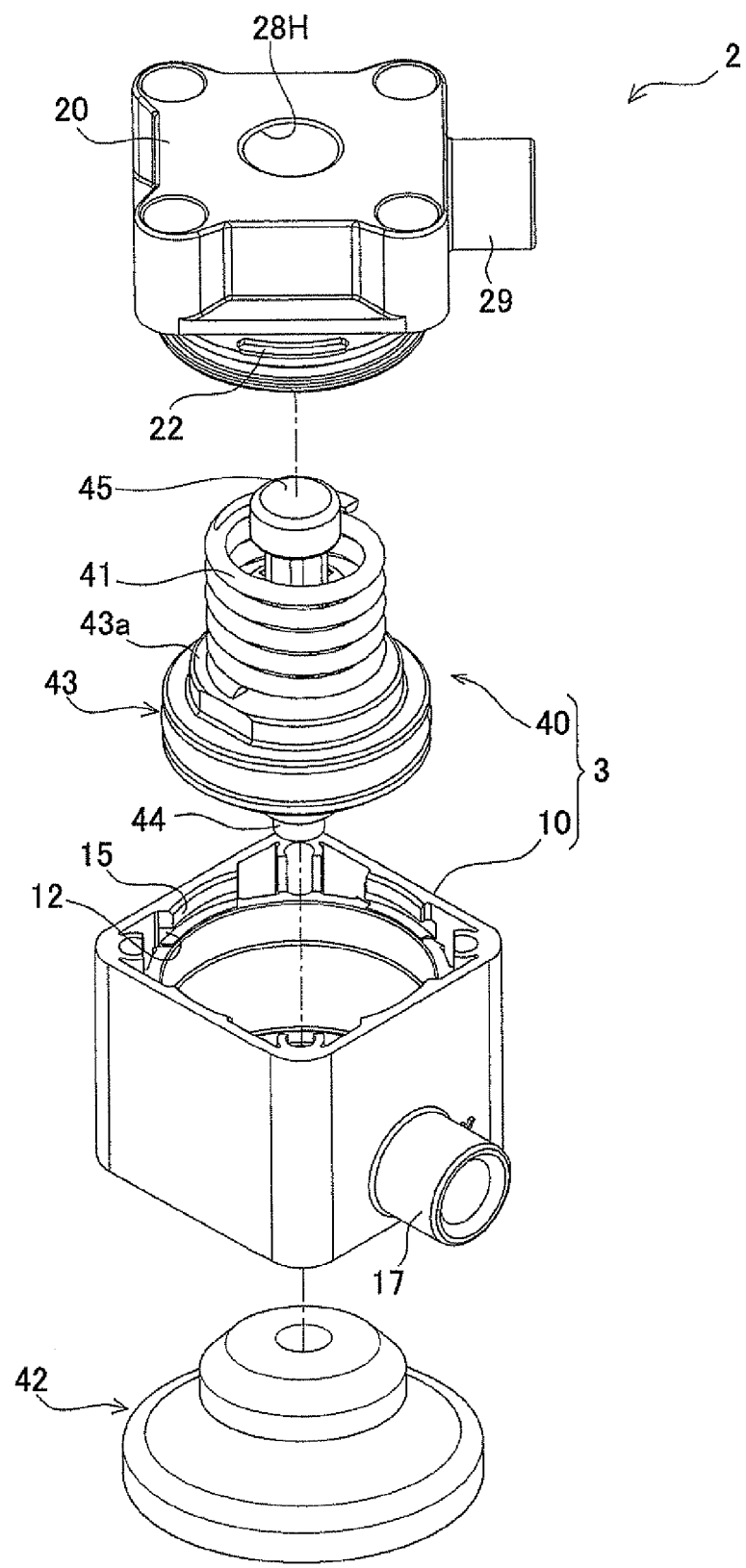
FIG. 1 is a perspective exploded view showing an actuator part of a chemical liquid valve in an embodiment.
Figure 5:
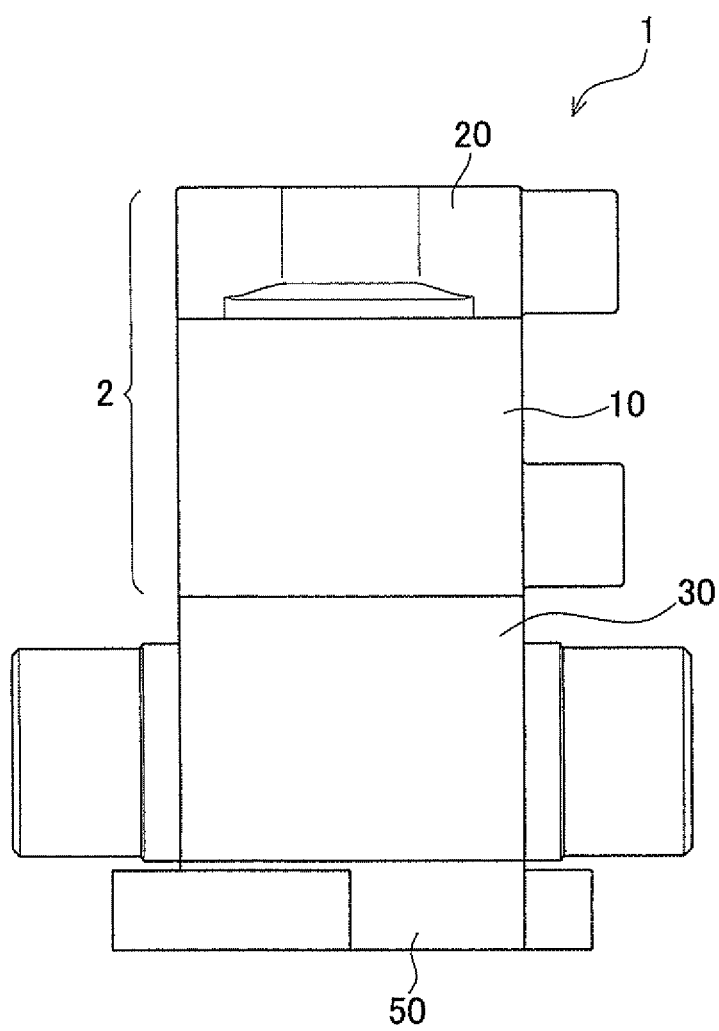
FIG. 5 is a front view of the chemical liquid valve in the embodiment.
Figure 6:
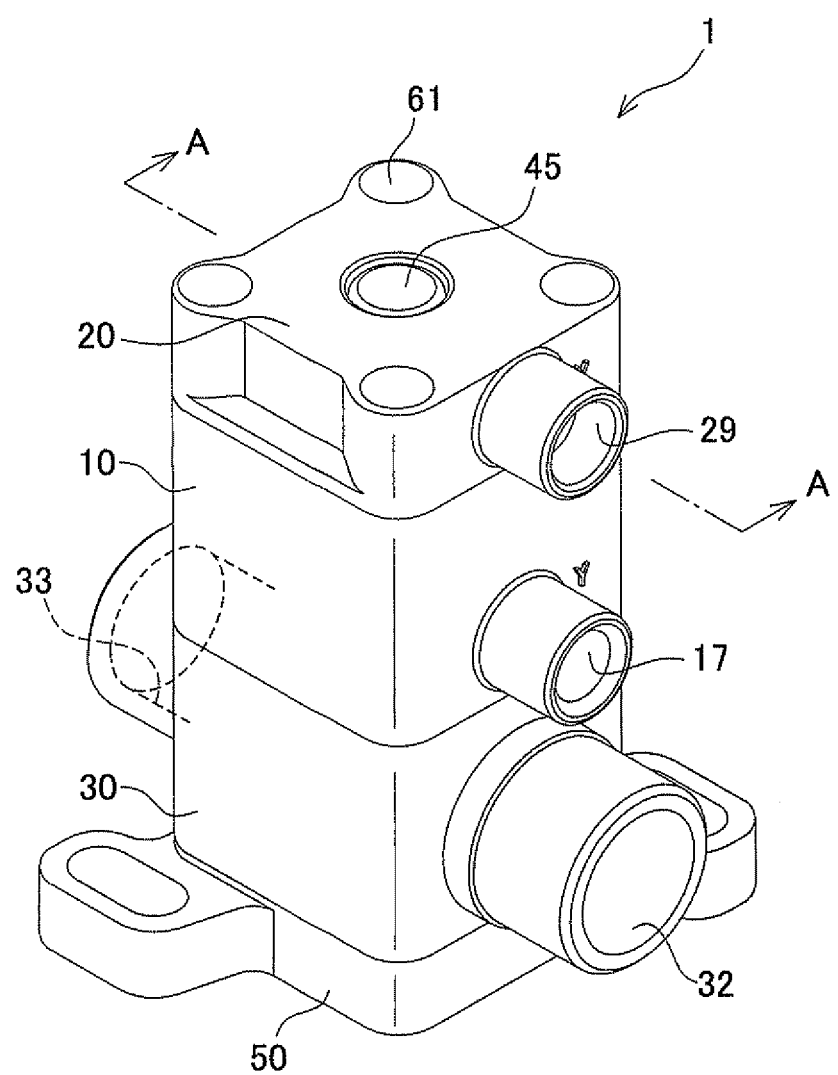
FIG. 6 is a perspective view of the chemical liquid valve in the embodiment.
Figure 12:
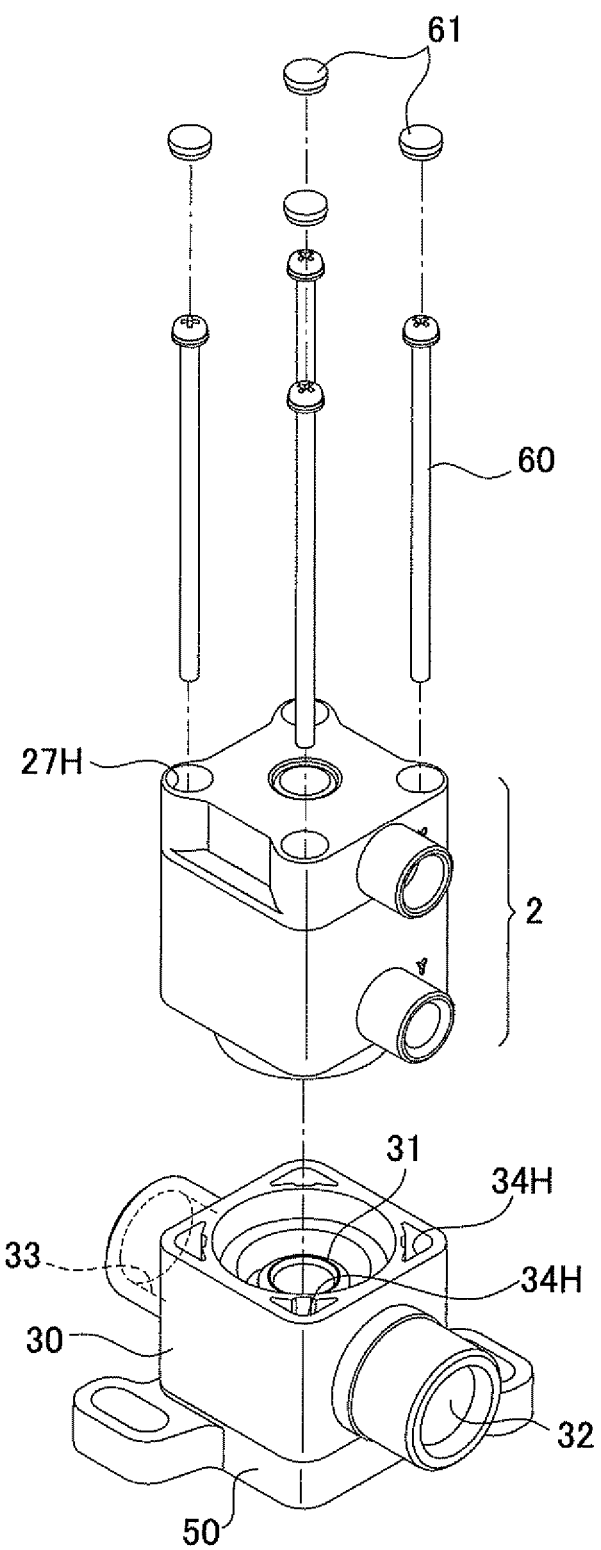
FIG. 12 is a perspective view to explain full assembling of the entire chemical liquid valve in the embodiment.
Figure 13:
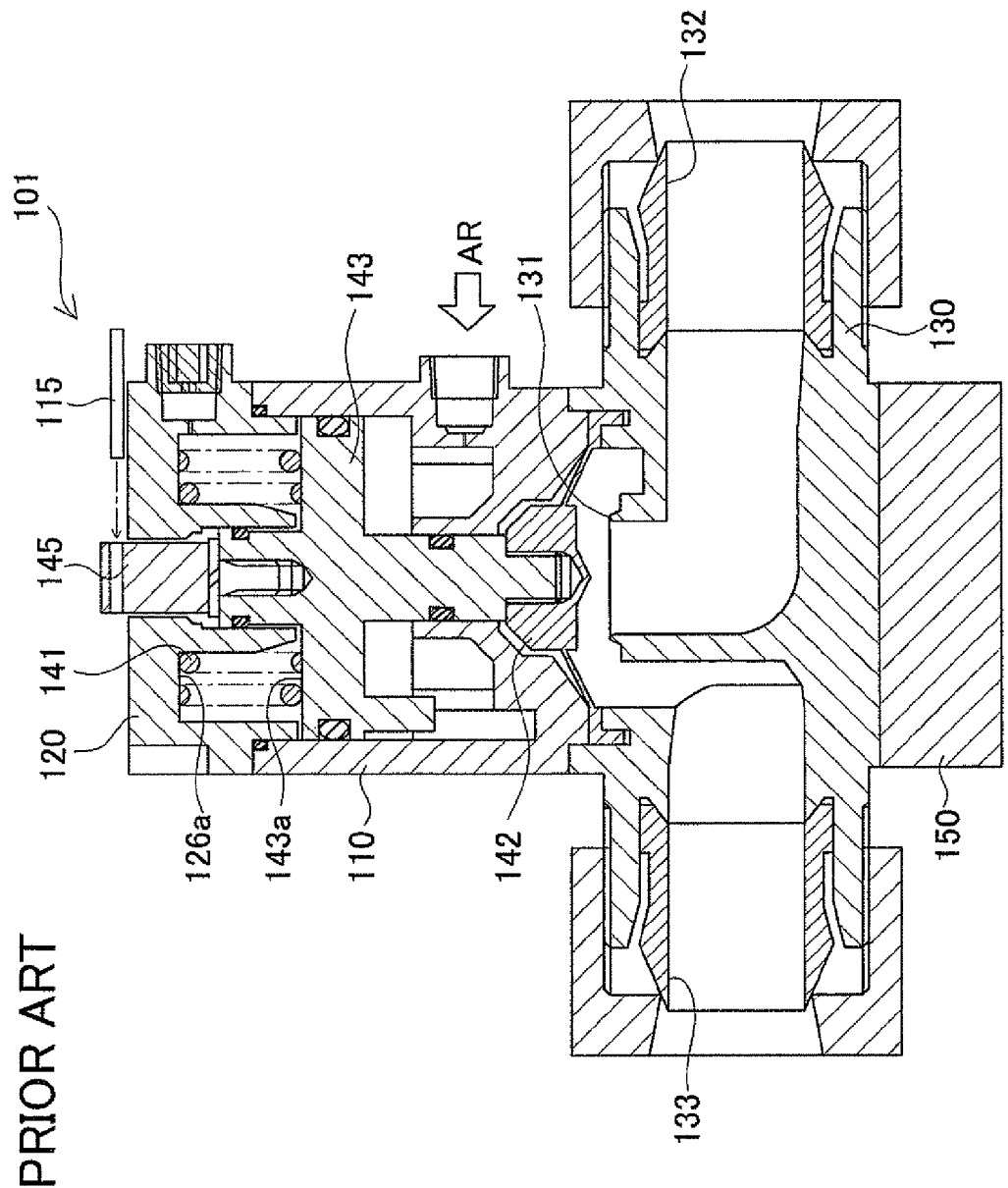
FIG. 13 is a sectional view of a conventional chemical liquid valve viewed in a direction corresponding to arrows A in FIG. 6, showing a state before a pin is inserted.
Figure 14:
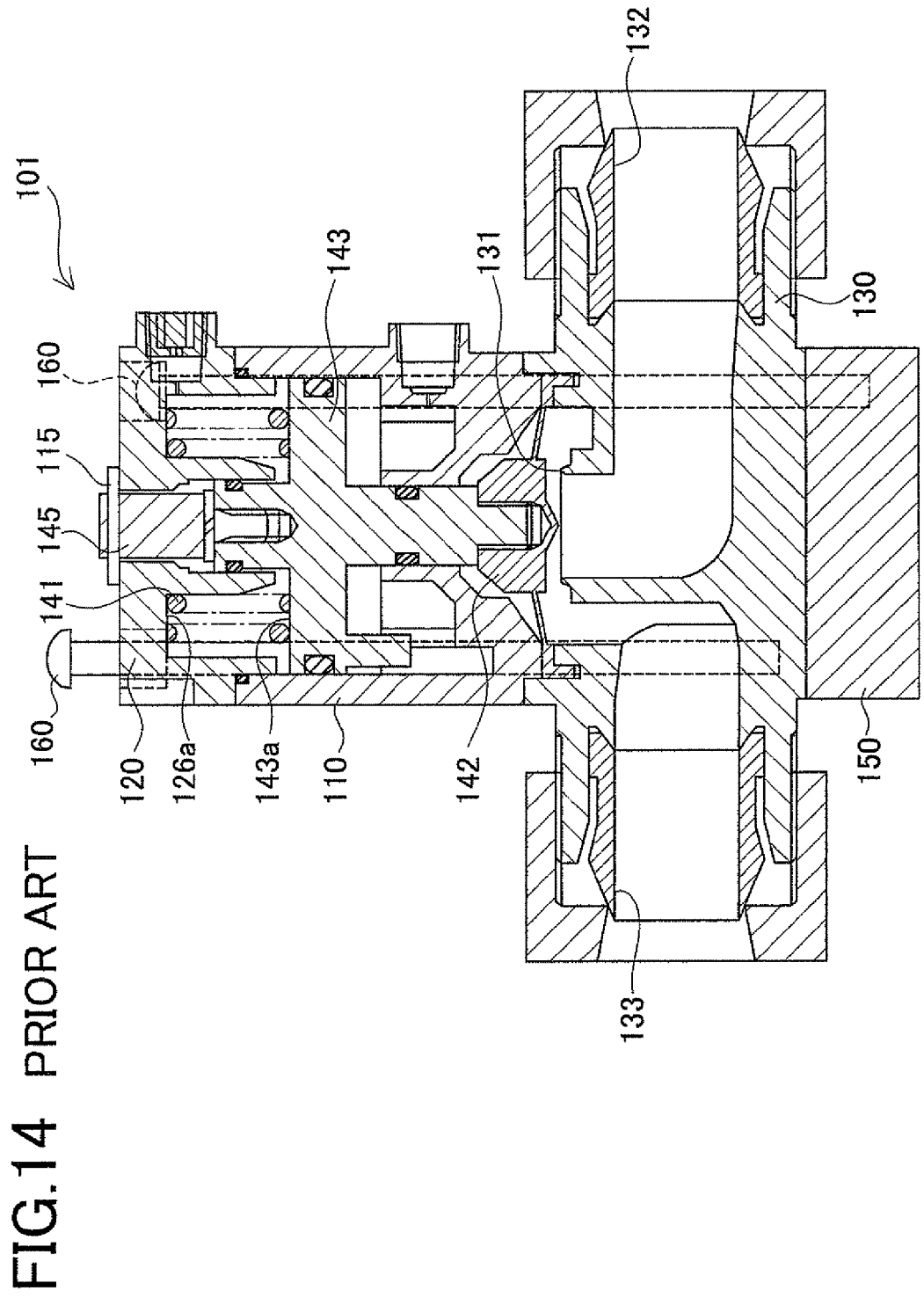
FIG. 14 is another sectional view of the chemical liquid valve shown in FIG. 13, showing a state after the pin is inserted.

FIG. 5 is a front view and FIG. 6 is a perspective view of the chemical liquid valve in this embodiment, respectively. FIG. 1 is an exploded perspective view of an actuator part of the chemical liquid valve. FIG. 12 is an exploded perspective view of the chemical liquid valve to explain full assembling of the entire valve.

A chemical liquid valve 1 mainly includes an actuator part 2, a body 30, and a mounting plate 50 as shown in FIG. 5.

The body 30 is formed with a valve seat 31, an inlet port 32, an outlet port 33, and others as shown in FIGS. 6 and 12. The body 30 is further formed with through holes 34H at four corners for passing bolts 60 individually. The body 30 and the actuator part 2 are stacked one on the other and integrally fixed to the mounting plate 50 with bolts 60 as mentioned later.

The actuator part 2 includes an actuator core part 3 including a cylinder 10 and a drive part 40 excepting a valve element 42, and a cover 20 as shown in FIG. 1. The drive part 40 includes a spring 41, the valve element 42, a piston 43, an indicator 45, and others.

In the drive part 40, a piston rod 44 extends downward from the piston 43 in an axial direction in FIG. 1. An indicator coupling part 46 is integrally formed with the piston 43 on an opposite side (a secondary chamber 19 side in FIG. 7) to a pressure receiving side (a primary chamber 18 side in FIG. 7). The piston rod 44 has an end that is coupled with the valve element 42 after temporary assembling of the actuator part 2 mentioned later.

The spring 41 is formed in a coil shape having a central hole in which the indicator 45 is inserted so that one end (a lower end in FIG. 1) of the spring 41 is located a support surface 43a of the piston 43 on the opposite side to the pressure receiving side.

Figure 8A:
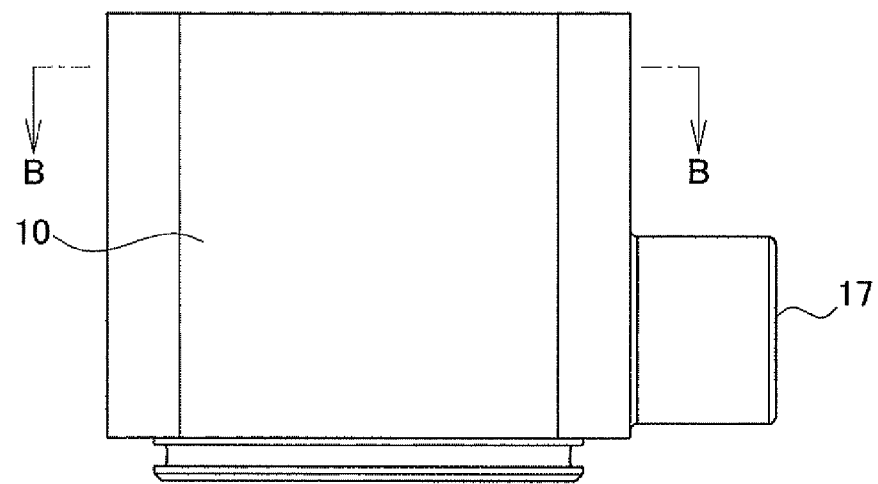
FIG. 8A is a front view of a cylinder of the chemical liquid valve in the embodiment.
Figure 8B:
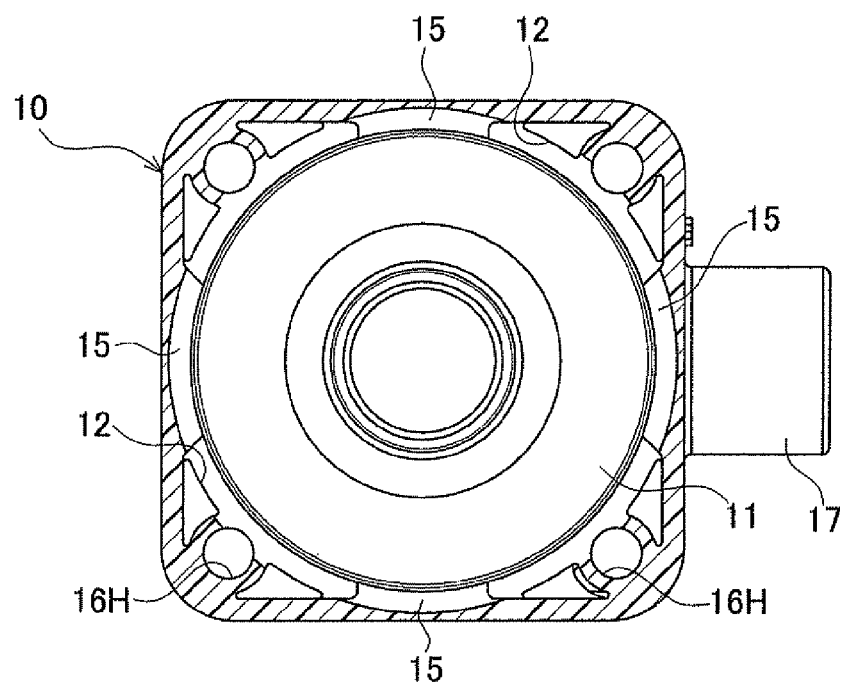
FIG. 8B is a cross sectional view of the cylinder of the chemical liquid valve in the embodiment, taken in the direction of arrows B-B in FIG. 8A.
Figure 9A:
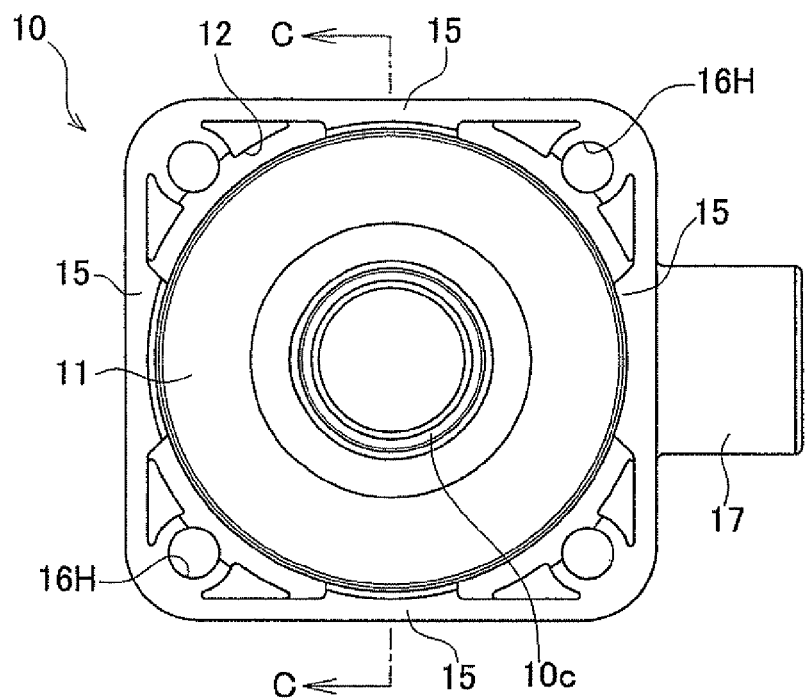
FIG. 9A is a plan view of the cylinder shown in FIG. 8A.
Figure 9B:
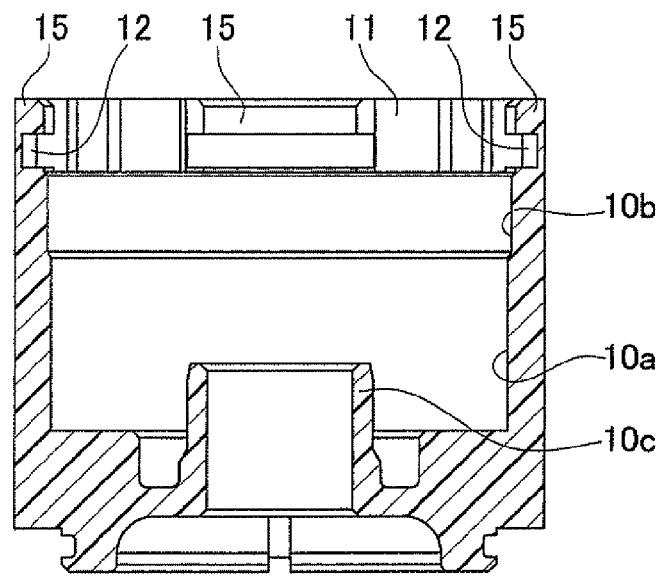
FIG. 9B is a cross sectional view of the cylinder taken in the direction of arrows C-C in FIG. 9A.

FIG. 8A is a front view of the cylinder 10 of the chemical liquid valve 1 in the present embodiment. FIG. 8B is a cross sectional view of the cylinder 10 taken in the direction of arrows B-B in FIG. 8A. FIG. 9A is a plan view of the cylinder 10 shown in FIG. 8A. FIG. 9B is a sectional view of the cylinder 10 taken in the direction of arrows C in FIG. 9A.

The cylinder 10 is made of fluorocarbon resin. In the present embodiment, specifically, the cylinder 10 is made of PVDF (Polyvinylidenefluoride, or difluoro) by injection molding into a block shape whose outer shape is almost square when seen from below, excepting an operation port 17. The cylinder 10 includes the operation port 17 in one of the side surfaces. The operation port 17 is communicated with a primary chamber 18 (see FIG. 7) formed for operation air AR on the pressure receiving side (a lower side in FIG. 7) of the piston 43 in the chemical liquid valve 1 after completion of assembling. The cylinder 10 has a first inner wall surface 10a on which the piston 43 is slidably mounted through a seal member such as an O ring placed on the outer periphery of the piston 43. This seal member serves to sealingly separate between the primary chamber 18 (on the pressure receiving side of the piston 43) and the secondary chamber 19 (on the opposite side to the pressure receiving side) which will be formed in the assembled chemical liquid valve 1.

In the chemical liquid valve 1, the valve element 42 is moved upward and downward with respect to the valve seat 31 by action of an urging force of the spring 41 and the pushing force of the pressurized operation air AR in a direction against the urging force. In the present embodiment, specifically, the chemical liquid valve 1 is a normally closed type valve configured such that: when the pushing force of operation air AR does not act, the valve 1 is closed by holding the valve element 42 in contact with the valve seat 31 by the urging force of the spring 41, and when the pushing force of operation air AR acts, the valve 1 is opened by moving the valve element 42 apart from the valve seat 31.

Figure 7:
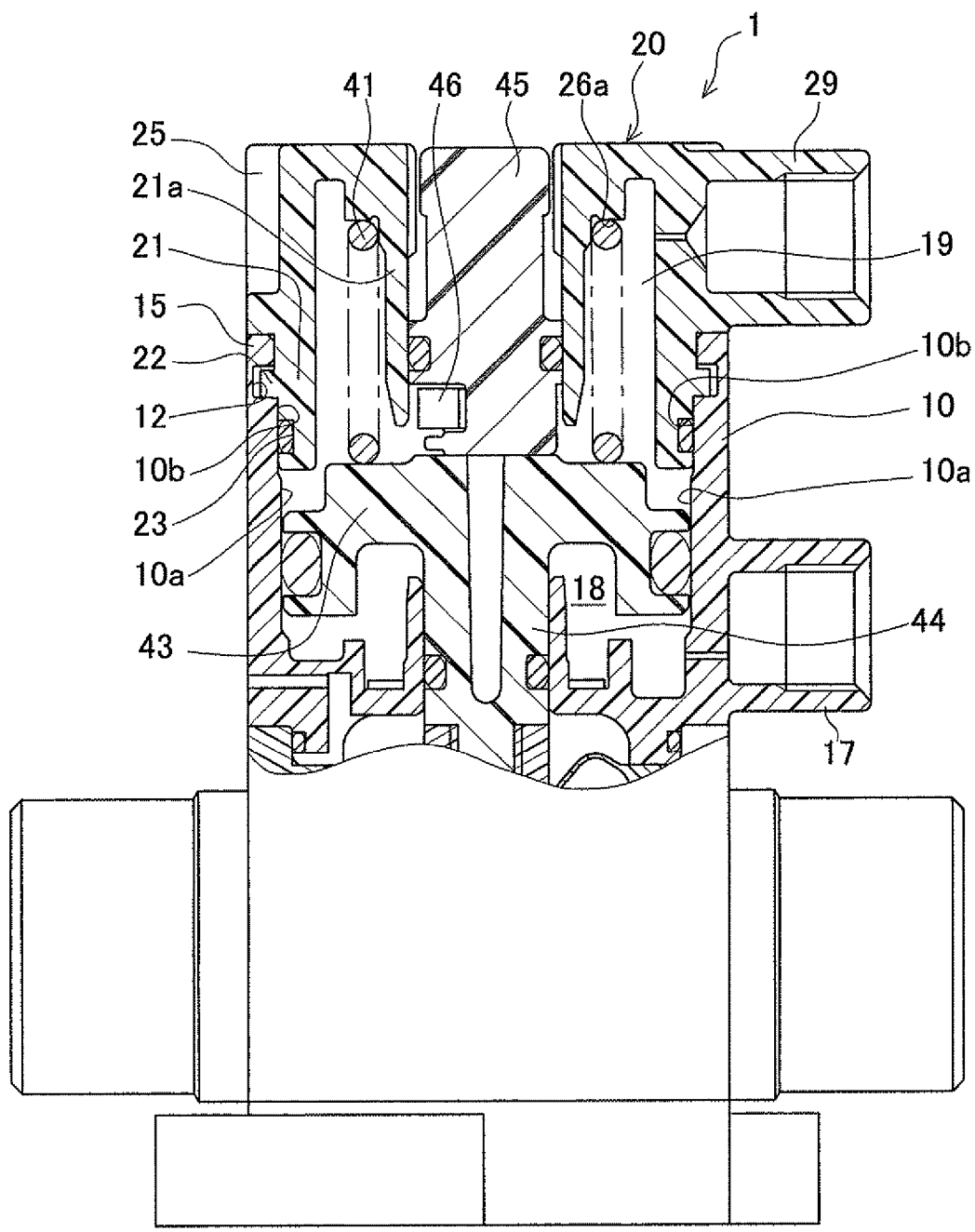
FIG. 7 is a partly sectional front view of the chemical liquid valve in the embodiment.

The cylinder 10 further has a second inner wall surface 10b above the first inner wall surface 10a as shown in FIGS. 7 and 9B. Above the second inner wall surface 10b, an opening 11 is defined by a circumferential inner wall 12. At four corners around the opening 11, as shown in FIG. 9A, through holes 16H are formed for insertion of the bolts 60. The circumferential inner wall 12 is formed with engagement parts 15 each protruding radially inwardly and having a circular arc shape extending along the inner wall 12. In this embodiment, the engagement parts 15 have the same shape and are arranged in four places at even intervals so as to extend almost along the side surfaces of the cylinder 10 respectively.

Each circumferential interval between the adjacent engagement parts 15 is longer than the circumferential length (arcuate length) of each engagement part 15 of the cover 20 mentioned later.

Figure 10:
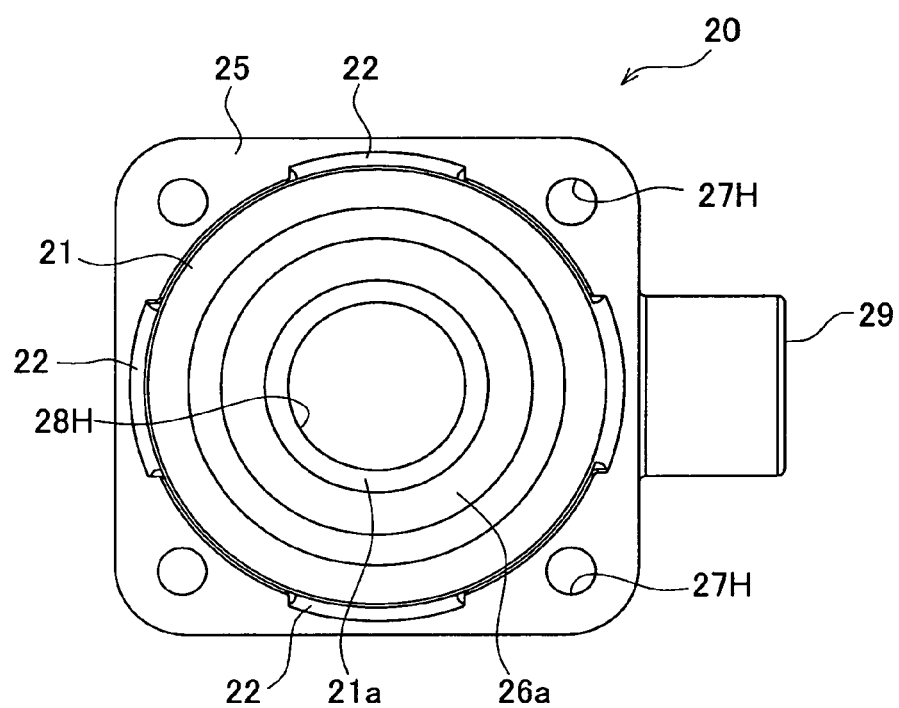
FIG. 10 is a bottom view of the cover of the chemical liquid valve in the embodiment, viewed from below.
Figure 11A:
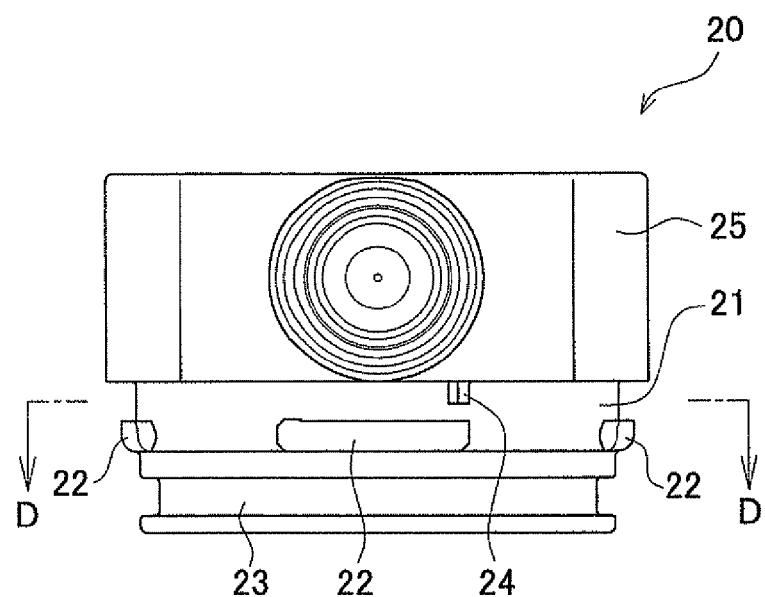
FIG. 11A is a right side view of the cover of FIG. 10.
Figure 11B:
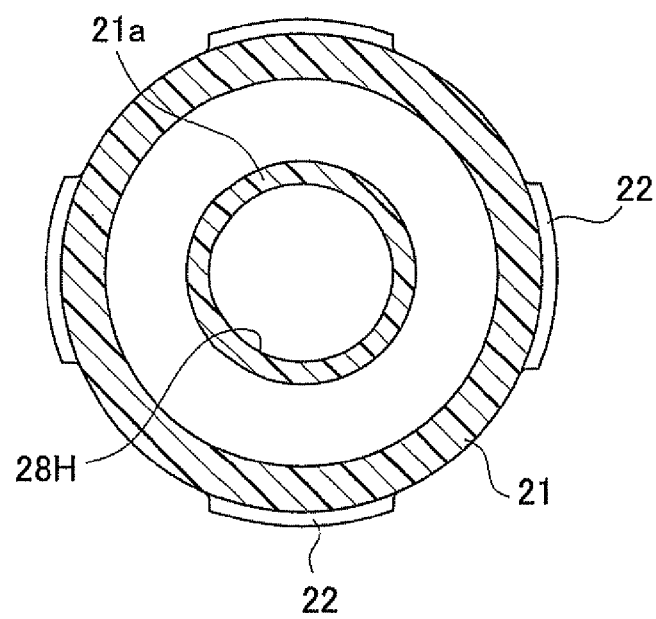
FIG. 11B is a cross sectional view of the cover taken in a direction of arrows D in FIG. 11A.

FIG. 10 is a bottom view of the cover 20 seen from below. FIG. 11A is a right side view of the cover 20 shown in FIG. 10. FIG. 11B is a cross sectional view of the cover 20 taken in the direction of arrows D in FIG. 11A.

The cover 20 is made of fluorocarbon resin. In this embodiment, specifically, the cover 20 is made of PVDF (Polyvinylidenefluoride, or difluoro) by injection molding into a block shape whose outer shape is almost square when seen from below, excepting an exhaust port 29.

As shown in FIGS. 10, 11A, and 11B, the cover 20 includes a cap part 25 to close the opening 11 of the cylinder 10 and a cylindrical annular part 21 extending downward from the cap part 25 and having a smaller diameter than the diameter of the opening 11 of the cylinder 10.

The cap part 25 is formed with the exhaust port 29 communicated with the secondary chamber 19 defined in the chemical liquid valve 1 in a completely assembled state. The outer shape (in bottom view) of the cap part 25 excepting the exhaust port 29 is almost square as well as the outer shape (in plan view) of the cylinder 10 excepting the operation port 17. The cap part 25 is formed with through holes 27H at four corners around the annular part 21 for insertion of the bolts 60. The cover 20 is also formed with a hollow cylindrical part 21a protruding inward (downward in FIG. 7) from the center of the upper surface of the cap part 25. The cylindrical part 21a has a through hole 28H extending concentrically with the annular part 21. The cover 20 has a flat support surface 26a located radially inward of the annular part 21 and around the cylindrical part 21a to support the other end (an upper end in FIG. 1) of the spring 41.

The annular part 21 is formed with protrusions 22 each protruding radially outward from the annular part 21. Each protrusion 22 has a circular arc shape corresponding to the shape of each engagement part 15 of the cylinder 10. The protrusions 22 are circumferentially arranged on the outer periphery of the annular part 21. In the present embodiment, the protrusions 22 have the same shape and are arranged in four places at even intervals so as to extend almost along the side surfaces of the cap part 25.

In other words, the protrusions 22 are located so as to engage with the engagement parts 15 of the cylinder 10 when the cover 20 is placed on and in alignment with the cylinder 10 by inserting the annular part 21 in the opening 11 of the cylinder 10.

The annular part 21 is formed with a stopper 24. After the cover 20 is placed to cover the opening 11 of the cylinder 10 and rotated at a predetermined angle with respect to the cylinder 10, further rotation of the cover 20 is restricted by the stopper 24.

The annular part 21 is further formed with a seal groove 23 circumferentially extending along the outer periphery. In this seal groove 23, a seal member such as an O ring is fitted to seal between the annular part 21 of the cover 20 and the inner wall surface 10b of the cylinder 10 while the cover 20 closes the opening 11 of the cylinder 10.

A method of assembling the chemical liquid valve 1 is explained below. Assembling of the chemical liquid valve 1 is carried out by first temporarily assembling the actuator part 2 and then fully assembling the entire valve 1 by stacking and integrally coupling the actuator part 2 temporarily assembled, the body 30, and the mounting plate 50 with bolts 60.

Figure 2:
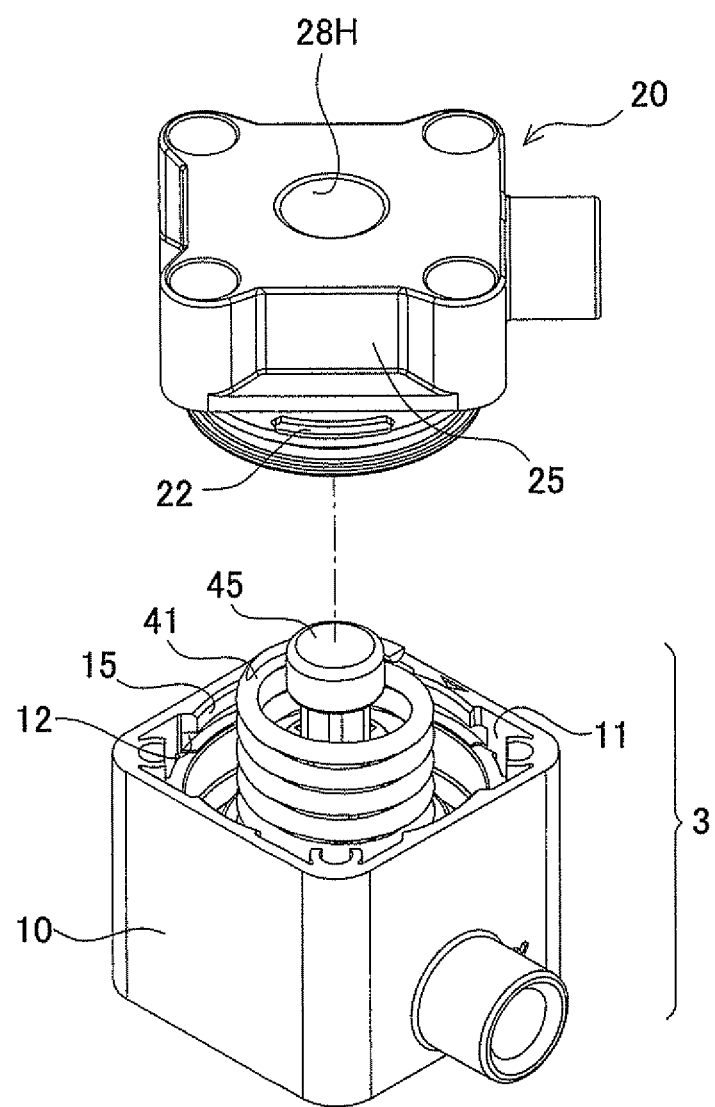
FIG. 2 is a perspective view of the actuator part of the chemical liquid valve in a state before temporary assembling in the embodiment.
Figure 3:
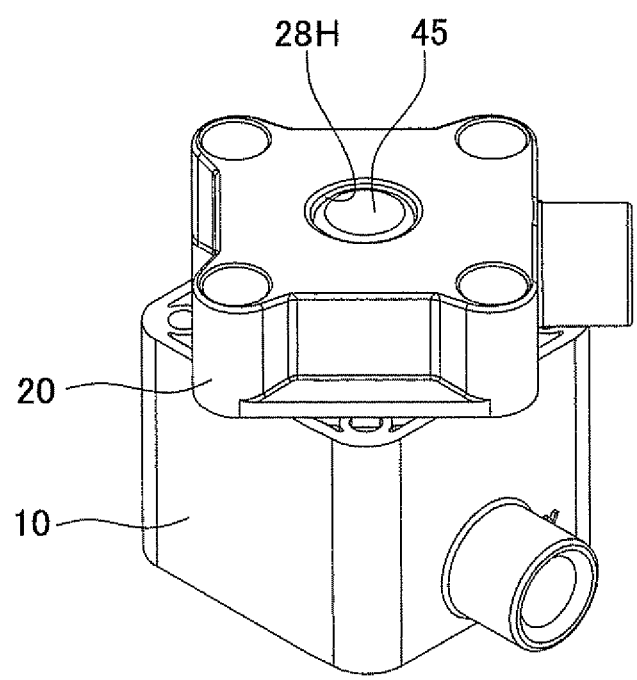
FIG. 3 is another perspective view of the actuator part in a state where a cover is placed to cover an actuator core part for the temporary assembling.
Figure 4:
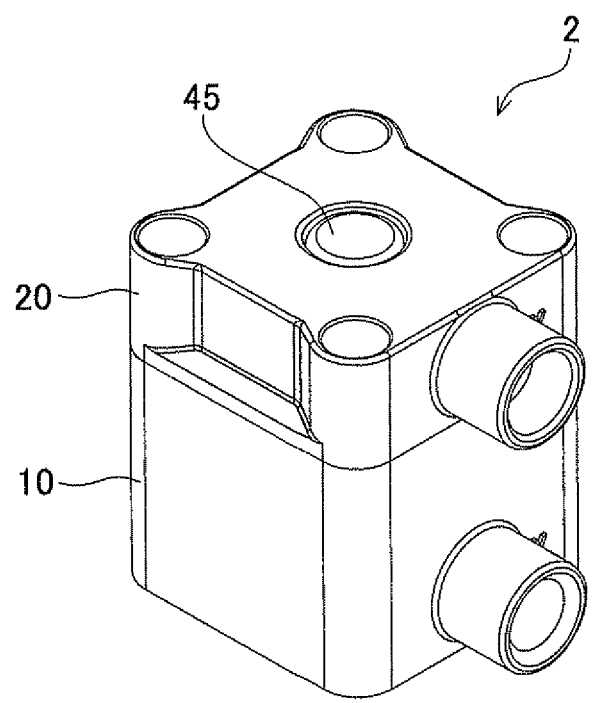
FIG. 4 is another perspective view of the actuator part in a state after completion of the temporary assembling.

Firstly, the temporary assembling of the actuator part 2 is explained referring to FIGS. 1 to 4. FIG. 2 is a perspective view of the actuator part 2 in a state before temporary assembling. FIG. 3 is another perspective view of the actuator part 2 in a state where the cover 20 is placed on the actuator core part 3 during temporary assembling. FIG. 4 is another perspective view of the actuator part 2 in a state after completion of the temporary assembling.

When the temporary assembling of the actuator part 2 is to be conducted, the drive part 40 is assembled in advance so that the piston rod 44 is to be connected with the valve element 42. To be concrete, the indicator 45 is attached to the end of the piston 43 on the opposite side (an upper side in FIG. 7) to the pressure receiving side. Then, the indicator 45 is inserted in the central hole of the spring 41 so that one end of the spring 41 is put on the support surface 43a of the piston 43.

As shown in FIG. 1, successively, the drive part 40 excepting the valve element 42 with the piston rod 44 extending downward is inserted in the opening 11 of the cylinder 10. Then, the piston rod 44 is inserted in the cylindrical part 10c (see FIGS. 9A and 9B) formed at the center of the inner bottom of the cylinder 10 so that the piston 43 is put on the upper end of the cylindrical part 10c. Thus, the actuator core part 3 is built up. At this stage, the spring 41 is in a normal state having the original length as shown in FIG. 2.

Subsequently, a seal member not shown is set in the seal groove 23 of the cover 20. The cover 20 is then attached to the actuator core part 3 by placing the cap part 25 in a skewed or twisted position at a predetermined angle with respect to the cylinder 10 so that their side surfaces are not flush with each other.

To be specific, the cover 20 is placed on the actuator core part 3 so that the indicator 45 coupled to the piston 43 with the indicator coupling part 46 is inserted in the through hole 28H of the cover 20 and the other end (an upper end in FIG. 1) of the spring 41 is placed in contact with the support surface 26a of the cap part 25. Then, the cover 20 is moved down by inserting the annular part 21 into the opening 11 of the cylinder 10 until the cap part 25 comes into contact with the cylinder 10 while compressing the spring 41 supported between the support surface 43a of the piston 43 and the support surface 26a of the cap part 25.

At that time, the cover 20 is in the skewed position relative to the cylinder 10 in the circumferential direction of the annular part 21. Accordingly, when the annular part 21 is inserted in the opening 11, the protrusions 22 of the cover 20 and the engagement parts 15 of the cylinder 10 do not interfere with each other.

When the annular part 21 is inserted in the opening 11 until the cap part 25 of the cover 20 is put on the cylinder 10 as shown in FIG. 3, the seal member set in the seal groove 23 presses against the first inner wall surface 10a of the cylinder 10, thereby sealingly closing the opening 11 of the cylinder 10.

The cover 20 is rotated with respect to the cylinder 10 until the stopper 24 of the cover 20 comes into contact with one of the engagement parts 15 so that the side surfaces of the cap part 25 become almost flush with the side surfaces of the cylinder 10, eliminating skew or twisting of respective side surfaces. Thus, the through holes 27H of the cover 20 are individually aligned with the through holes 16H of the cylinder 10 of the cylinder 10 at four corners.

At that time, the annular part 21 inserted in the opening 11 is also rotated together with the cap part 25. The protrusions 22 of the annular part 21 then engage with the engagement parts 15 arranged in the opening 11 of the cylinder 10, thereby integrally tightly connecting the cylinder 10 and the cover 20 to each other.

As above, the temporary assembling of the actuator part 2 is completed in which the cylinder 10 and the cover 20 are integrally connected as shown in FIG. 4.

Subsequently, the full assembling of the entire chemical liquid valve 1 is performed by stacking the temporarily assembled actuator part 2, the body 30, and the mounting plate 50 one on another and integrally connecting them with the bolts 60. To be specific, after the temporary assembling of the actuator part 2, the distal end of the piston rod 44 of the piston 43 on the pressure receiving side is connected to the valve element 42 (see FIG. 1).

As shown in FIG. 12, thereafter, the through holes 27H of the cover 20 aligned with the through holes 16H of the cylinder 10 in the actuator part 2 are aligned with the through holes 34H of the body 30 respectively. Then, the actuator part 2 is stacked on the body 30 by holding a peripheral edge portion of the valve element 42 between the cylinder 10 of the actuator part 2 and the body 30 and setting a lower portion of the actuator part 2 (a lower part of the cylinder 10) in an upper portion of the body 30. Further, the stacked actuator part 2 and body 30 is placed on the mounting plate 50 as one unit.

The bolts 60 are inserted from the through holes 27H of the cover 20, passing through the through holes 16H of the cylinder 10 and the through holes 34H of the body 30, and tightened against the mounting plate 50 to fix the actuator part 2, the body 30, and the mounting plate 50 to each other. Rubber caps 61 are individually inserted in the through holes 27H of the cover 20 to cover the heads of the bolts 60.

As above, the actuator part 2, the body 30, and the mounting plate 50 are integrally stacked and fixed. The full assembling of the entire chemical liquid valve 1 is thus completed.

The following explanation will be given to operations and effects of the assembling structure of the actuator part (the "actuator-part assembling structure") of the chemical liquid valve 1 in the present embodiment having the aforementioned configuration and the chemical liquid valve 1 formed with the structure.

In the actuator-part assembling structure of the chemical liquid valve 1 in the embodiment, the cover 20 is formed with the protrusions 22 each extending in a radial direction of the valve element 42 and the cylinder 10 is formed with the engagement parts 15 each being engageable with the protrusions 22. The cover 20 is placed while compressing the spring 41 so that the cap part 25 covers the opening 11 of the cylinder 10. Then, the protrusions 22 are engaged with the engagement parts 15 to integrally connect the cylinder 10 and the cover 20 without detaching from each other. Accordingly, the assembling of the chemical liquid valve 1 needs no bolts which are conventionally needed to temporarily assemble the unitized actuator core part 3 including the cylinder 10, the spring 41, the valve element 42, and others with the cover 20 prior to the full assembling of the entire chemical liquid valve 1.

Specifically, the chemical liquid valve 1 mainly includes, in addition to the cover 20 and the actuator core part 3, the body 30 having the valve seat 31, the inlet port 32, and the outlet port 33, and the mounting plate 50 for fixing the chemical liquid valve 1. During manufacture or after disassembling for maintenance of the chemical liquid valve 1, a worker performs the full assembling of the entire chemical liquid valve 1 by integrally stacking and assembling the cover 20, the actuator core part 3, the body 30, and the mounting plate 50.

For assembling of the chemical liquid valve 1, the spring 41 is set as being compressed from its normal state having an original length. This causes a trouble for the worker to assemble the valve 1. Further, during disassembling for maintenance of the chemical liquid valve 1 after use, when the cover 20 is detached, the compressed spring 41 is apt to expand back at a burst to its original state. It is therefore necessary to improve the workability of the worker during disassembling of the chemical liquid valve 1 for maintenance. Accordingly, since the temporary assembling of the actuator core part 3 and the cover 20 is required before the full assembling, bolts are conventionally used only for the temporary assembling.

On the other hand, the actuator-part assembling structure of the chemical liquid valve 1 in the embodiment does not need any bolt for the temporary assembling. This can reduce the total number of components of the chemical liquid valve 1, leading to cost reduction of the chemical liquid valve 1.

In the actuator-part assembling structure of the chemical liquid valve 1 in the embodiment, the cylinder 10 has the inner wall 12 formed with the opening 11, and the cover 20 includes the annular part 21 having a smaller diameter than the diameter of the opening 11 of the cylinder 10. Each engagement part 15 protrudes radially inwardly from the inner wall 12 of the cylinder 10 and extends in the circular arc form in the circumferential direction of the inner wall 12. Each protrusion 22 protrudes radially outwardly from the annular part 21 of the cover 20 and extends in the circular arc form in the circumferential direction of the annular part 21, corresponding to the shape of each engagement part 15. Even when the spring 41 whose one end is supported on the cover 20 has a large urging force, the urging force of the spring 41 acts evenly, not locally, on the engagement parts 15 and the protrusions 22. Accordingly, even if the urging force of the spring 41 largely acts between the cylinder 10 and cover 20, the cylinder 10 and the cover 20 are held in firm engagement relation.

The cover 20 and the cylinder 10 can be easily connected to each other by simply placing the cover 20 on the cylinder 10 as one unit and relatively rotating the cylinder 10 and the cover 20 to a position where the protrusions 22 of the cover 20 engage with the engagement parts 15 of the cylinder 10.

The temporary assembling of the cylinder 10 of the actuator core part 3 with the cover 20 does not need any bolts which would be conventionally required. This enables weight saving of the chemical liquid valve 1.

In the actuator-part assembling structure of the chemical liquid valve in the embodiment, the engagement parts 15 are formed at four places and the protrusions 22 are formed at four places. For assembling the cylinder 10 and the cover 20, the cover 20 is rotated with respect to the cylinder 10 so that the cylinder 10 and the cover 20 are integrally connected to each other. The engagement parts 15 and the protrusions 22 are arranged at four places respectively at regular intervals so that while the cover 20 is under the urging force of the spring 41, the rotation angle of the cover 20 with respect to the cylinder 10 falls within 45°, for example. This makes it possible to integrate the cylinder 10 and the cover 20 with good workability without imposing a large workload on a worker.

In the actuator-part assembling structure of the chemical liquid valve 1 in the embodiment, the annular part 21 of the cover 20 is formed with the stopper 24 for restricting further rotation of the cover 20 beyond a predetermined angle with respect to the cylinder 10. By simply rotating the cover 20 with respect to the cylinder 10 until the stopper 24 comes into contact with one of the engagement parts 15 of the cylinder 10 while the protrusions 22 engage with the engagement parts 15, the cylinder 10 and the cover 20 can be aligned with each other.

In the actuator-part assembling structure of the chemical liquid valve 1 in the embodiment, the cylinder 10 and the cover 20 are made of Polyvinylidenefluoride (PVDF) which is fluorocarbon resin. Accordingly, this resin has relatively stronger mechanical strength and higher chemical proof against strong acid fluid and alkaline fluid than other resins and also can be manufactured by injection molding.

Concrete examples of the fluorocarbon resin may include PVDF (Polyvinylidenefluoride, or difluoro), and PTFE (polytetrafluoroethylene, or tetrafluoro).

Meanwhile, recently, in semiconductor manufacturing industry and liquid crystal panel manufacturing industry subject to severe price competition, many chemical liquid valves are used in semiconductor manufacturing devices and liquid crystal panel manufacturing devices.

The chemical liquid valve 1 in the embodiment is a chemical liquid valve formed with the aforementioned actuator-part assembling structure. The chemical liquid valve 1 is therefore useful in the semiconductor manufacturing devices, liquid crystal panel manufacturing devices, and others. This can contribute to cost reduction in the semiconductor manufacturing industry and liquid crystal panel manufacturing industry exposed to severe price competition.

The present invention is explained in the above embodiment but not limited thereto. The present invention may be embodied in other specific forms without departing from the essential characteristics thereof.

(1) In the above embodiment, for instance, both the cylinder 10 and the cover 20 are made of PVDF (Polyvinylidenefluoride, or difluoro) by injection molding.

As an alternative, both the cylinder and the cover may be made of other fluorocarbon resin such as PTFE (Polytetrafluoroethylene, or tetrafluoro). As another alternative, the cylinder and the cover may be made of different fluorocarbon resins. Furthermore, the cylinder and the cover may be produced by cutting.

(2) In the above embodiment, the outer shape of the cylinder 10 excepting the operation port 17 in plan view is almost square and the outer shape of the cap part 25 is also almost square in bottom view as with the outer shape of the cylinder 10. The outer shapes of the cylinder and the cover are not limited to the above embodiment and may be modified or changed variously.

(3) In the above embodiment, the engagement parts 15 have the same shape, each extending along the corresponding side surface of the cylinder 10, and are arranged at four places spaced at even intervals.

However, the number of engagement parts provided in the cylinder and the positions of the engagement parts arranged in the cylinder are not limited to the above embodiment and may be appropriately changed. Similarly, the protrusions 22 have the same shape, each extending along the corresponding side surface of the cap part 25, and are arranged at four places spaced at even intervals. As with the engagement parts, the number of protrusions provided in the cover and the positions of the protrusions arranged in the cover are not limited to the above embodiment and may be appropriately changed.

(4) In the above embodiment, the fluid control valve is configured as the chemical liquid valve 1 of normally closed type in which one end of the spring 41 is supported on the support surface 43a of the piston 43 and the other end is supported on the support surface 26a of the cover 20. This valve is closed by holding the valve element 42 in contact with the valve seat 31 by the urging force of the spring 41 when the pushing force of operation air AR does not act.

Alternatively, the fluid control valve may be a normally open type valve in which an urging member is placed in contact with one surface of a piston corresponding to the pressure receiving side of the piston 43 in the above embodiment and the bottom of a cylinder, so that a valve element is held apart from a valve seat by the urging force of the urging member when the pushing force of operation air does not act, and the valve element is moved into contact with the valve seat by the pushing force of operation air when acts.

In the normally open type fluid control valve, an operation port is located in the position of the exhaust port 29 of the chemical liquid valve 1 in the above embodiment of normally closed type and an exhaust port is located in the position of the operation port 17.

While the presently preferred embodiment of the present invention has been shown and described, it is to be understood that this disclosure is for the purpose of illustration and that various changes and modifications may be made without departing from the scope of the invention as set forth in the appended claims.

REFERENCE SIGNS LIST

1 Chemical liquid valve (Fluid control valve)
2 Actuator part
10 Cylinder
11 Opening
12 Inner wall
15 Engagement part
20 Cover
21 Annular part
22 Protrusion
24 Stopper
31 Valve seat
41 Spring (Urging member)
42 Valve element

The invention claimed is:

1. A method for assembling an actuator part of a fluid control valve including (1) an actuator part having (i) a cylinder in which an urging member is placed for urging a valve element, the cylinder including an opening, and (ii) a cover for closing the opening of the cylinder; (2) a body; and (3) a mounting plate, the fluid control valve being arranged to control the flow of fluid by bringing the valve element into or out of contact with a valve seat, the method comprising:
   forming the cover with a protrusion on an outer surface of the cover to extend outwardly in a radial direction of the valve element and forming the cylinder with an engagement part on an inner surface of the cylinder to be engageable with the protrusion;
   placing the cover to hold the urging member in a compressed state in the cylinder and cover the opening of the cylinder;
   engaging the protrusion and the engagement part with each other so that the cylinder and the cover are integrally connected to each other without separation in a temporarily assembled state where the urging member is held in the compressed state; and
   integrally stacking and fixing the actuator part in the temporarily assembled state, the body, and the mounting plate with a bolt.

2. The method for assembling an actuator part of a fluid control valve according to claim 1, wherein
   the cylinder includes an inner wall defining the opening,
   the cover includes an annular part having a smaller diameter than the diameter of the opening of the cylinder,
   the engagement part is formed to protrude radially inwardly from the inner wall of the cylinder and extend in a circular arc shape in a circumferential direction of the inner wall, and
   the protrusion is formed to protrude radially outwardly from the annular part of the cover and extend in a circular arc shape in a circumferential direction of the annular part, the circular arc shape corresponding to the shape of the engagement part.

3. The method for assembling an actuator part of a fluid control valve according to claim 2, wherein
   the engagement part is formed at a plurality of positions,
   the protrusion includes a plurality of protrusions arranged at a plurality of positions,
   the cylinder and the cover are assembled in such a manner that the cover is rotated with respect to the cylinder so that the cylinder and the cover are integrally connected to each other.

4. The method for assembling an actuator part of a fluid control valve according to claim 3, wherein at least one of the cylinder and the cover is formed with a stopper for restricting further rotation of the cover beyond a predetermined angle with respect to the cylinder.

5. The method for assembling an actuator part of a fluid control valve according to claim 1, wherein the cylinder and the cover are made of fluorocarbon resin.

6. A fluid control valve formed with the method for assembling an actuator part of a fluid control valve according to claim 1.

* * * * *